(No Model.) 3 Sheets—Sheet 1.

J. W. HYATT.
FILTER.

No. 293,743. Patented Feb. 19, 1884.

(No Model.) 3 Sheets—Sheet 2.

J. W. HYATT.
FILTER.

No. 293,743. Patented Feb. 19, 1884.

Attest:
Herman Gustow
William B. Ellison

Inventor:
John W. Hyatt,
By Chas. C. Gill
Attorney.

(No Model.) 3 Sheets—Sheet 3.

J. W. HYATT.
FILTER.

No. 293,743. Patented Feb. 19, 1884.

Attest:
Herman Gustow
William B. Ellison

Inventor:
John W. Hyatt
By Chas. E. Gill
Attorney

UNITED STATES PATENT OFFICE.

JOHN W. HYATT, OF NEWARK, NEW JERSEY.

FILTER.

SPECIFICATION forming part of Letters Patent No. 293,743, dated February 19, 1884.

Application filed August 11, 1883. (No model.)

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

The invention relates to improvements in filters; and it consists in a novel apparatus, and in the arrangement therein of different grades of filtering material in independent compartments, whereby the varying sizes of the impurities to be removed from the water or other liquid may be retained by the appropriate sizes of the filtering-granules, and afterward discarded by washing the bed of filtering material, the construction being such that each grade of filtering agent may be cleansed independently of that in the adjacent compartments.

It is well known to persons skilled in the art to which the invention relates that in filtering water heavily charged with impurities, if a bed or filtering agent the elements of which are sufficiently minute to retain the finer impurities is employed, the coarse particles of foreign matter will rapidly load the bed, clogging the passage of the water through the same and rendering its employment unsuccessful; and it is equally well understood that if a filter-bed composed of elements sufficiently coarse to arrest the larger impurities without clogging is made use of, the finer impurities will pass with the water unarrested.

It is the purpose of the present invention to provide a filter which will rapidly and effectually cleanse water of both the fine and coarse impurities without clogging, and in a manner which will render it practically useful.

The nature and advantages of my invention will appear in full hereinafter, and are indicated in the accompanying drawings, in which—

Figure 1:
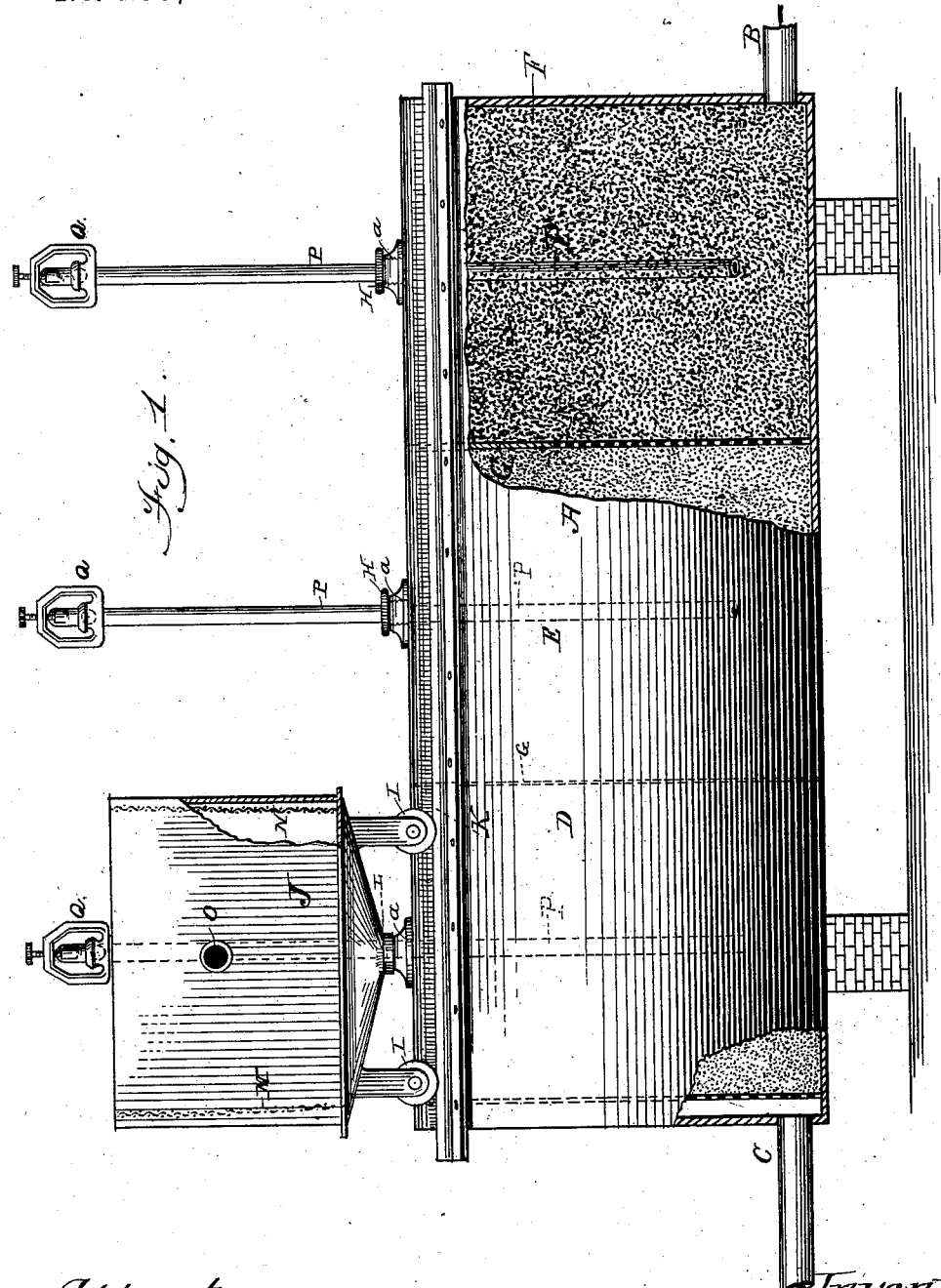
Figure 2:
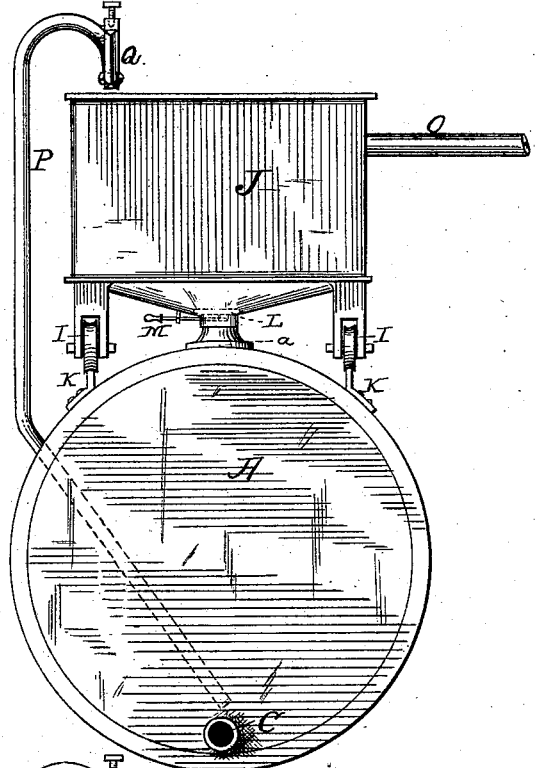
Figure 4:
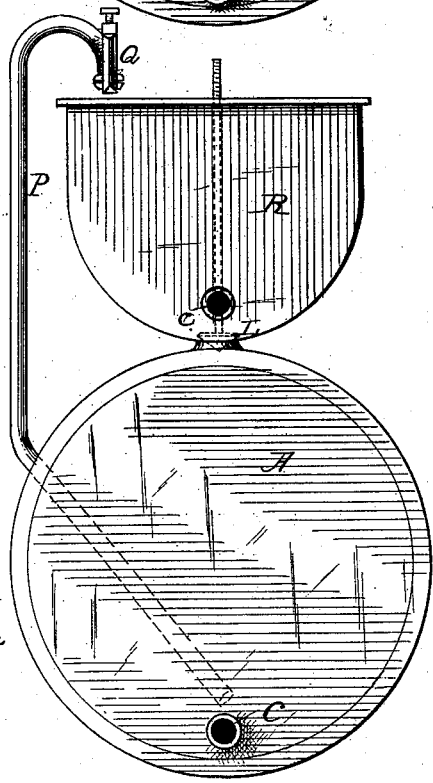
Figure 3:
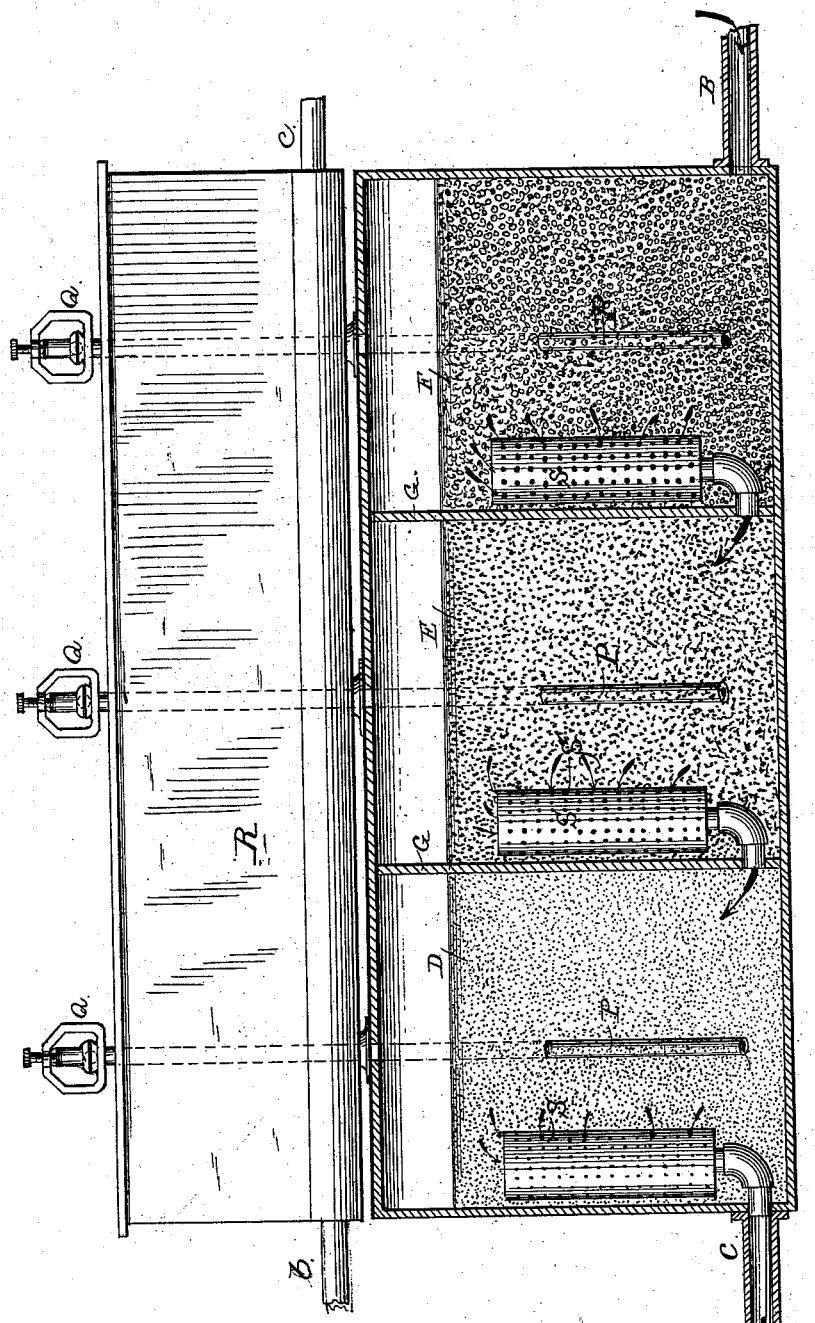

Figure 1 is a side view of an apparatus embodying the elements of the invention. Fig. 2 is an end view of same. Figs. 3 and 4 are similar views of a modified form of apparatus.

In the accompanying drawings, A denotes a cylindrical receptacle, having an inlet-pipe, B, at one end and an outlet, C, at the other. The receptacle A is subdivided in the present instance into three compartments, D E F, by the partitions G, composed, mainly, of wire-cloth or perforated metal, the upper portion of the partitions being imperforate. Within the compartments D E F is placed the filtering substance, which will usually be in comminuted form, and will consist of three grades or sizes of material, the more finely comminuted grade being in the compartment, D, nearest the outlet, while the coarse quality is within the compartment, F, adjacent to the inlet. In the top of each compartment of the apparatus is provided an aperture or hole, *a*, having a removable cover. In the machine as now constructed this cover consists of a screw-plug, H, which may be applied and removed at will. The material in the compartments D E F will naturally settle somewhat upon the passage of the water through the apparatus, and to provide for this action and prevent the water from passing over the top of the filtering material, instead of through it, when seeking an outlet, the upper portions of the partitions G are imperforate. At a suitable distance below the upper line of the filter-bed the partitions G are supplied with numerous perforations, so as to permit the rapid escape of the water.

Over the receptacle A is mounted, upon wheels I, the traveling carriage or auxiliary receptacle J, the wheels being arranged to run on the track K, secured directly upon the body A. The carriage J will be of suitable size to contain the filtering elements of any one of the compartments D E F, and is furnished in its bottom with a valve, L, which may be opened or closed by the hand-lever M, and through which, when open, the contents of the carriage may be allowed to pass into the proper compartment of the receptacle A by way of the opening *a*. The sides of the carriage J have a lining of perforated metal or wire-cloth, N, separated a slight distance therefrom, and from the space between this lining and the sides of the carriage is led a waste-pipe, O, which conducts off the water used in washing the filtering media. The top of the carriage J will remain uncovered, as the most convenient construction.

From the lower part of each compartment D E F there extends upward a transfer-pipe, P, their upper end being bent inward over the receptacle A, so that the carriage J may be brought under any one of them, as desired. Upon the upper end of the transfer-pipes P is provided a rubber ball-valve, Q, of the nature described and claimed in my application for Letters Patent of the United States for improvements in the art of filtration, filed August 1, 1883.

In the employment of the apparatus hereinbefore described, the water or other liquid to be filtered enters the compartment F through the inlet B, and finds its way thence through the perforated partition G into the compartments E D and the filter-beds therein contained, and thence into the delivery-pipes through the outlet C, being effectually cleansed in transit. The coarser impurities in the liquid being filtered are arrested by the coarse filtering medium in the compartment F, while the next finer impurities are retained by the corresponding grade of the filtering material in the compartment E. The fine particles of foreign matter contained in the liquid pass with the liquid through the filter-beds E F, and are arrested by the finely-comminuted bed of filtering elements in the compartment D. Thus it will be seen that the filter-bed is so subdivided and graded that the coarse impurities in the liquid will not clog the bed, nor will the finer impurities escape with the liquid. It will be plain to those skilled in the art that the effect of this gradation of the filter-bed to the impurities to be arrested will be to produce an apparatus capable of filtering the maximum amount of liquid within a given time. It is not to be considered, however, that in this application I seek to cover, broadly, the grading of the filtering medium in the order described.

When the filtering medium in any one of the compartments D E F becomes foul from the arrested foreign matter, it may be cleansed by moving the carriage J directly over the same, opening the rubber ball-valve Q in the pipe extending over the carriage, and closing the outlet C. The flow of the water will then carry the elements of the filter-bed into the transfer-pipe P and cause its discharge therefrom into the carriage J. The flow of water continuing, the foreign matter will be detached from the elements of the bed and pass off through the waste-pipe O, after which the filtering elements may be returned to the compartment by opening the passage through the hole or aperture $a$, when the said elements will pass back into their proper compartment. The rubber ball-valve on the upper end of the pipe V will then be closed and the outlet C opened, when the filtering may be proceeded with as before. In this method of washing the filter-beds I have made use of the principle described in Letters Patent of the United States granted to me on the 6th day of March, 1883, and numbered 273,542.

In Figs. 3 and 4 I illustrate a modified form of the apparatus shown in Figs. 1 and 2, the difference between them consisting, merely, in substituting a stationary receptacle, R, for the carriage J, and perforated cylinders S in the separate compartments for the perforated partitions G. The stationary receptacle R rests upon the body A, and has in its bottom a valve, L, connecting with each compartment. The receptacle R will also be provided with an inlet, $b$, and an outlet, $c$, and it will remain open at the top, so as to receive the contents of the compartments D E F, respectively, through the transfer-pipes. The outlet $c$ is for the escape of the water employed in washing the filtering material, and the inlet $b$ may be used or not, as desired, for permitting the entrance of water for washing the receptacle, or for carrying the filtering elements back to their former compartment through the appropriate valve T.

In the operation of the filter shown in Figs. 3 and 4 the liquid to be purified, after entering the compartment F, passes through the filtering medium therein, finding its way into the perforated cylinder S, and thence into the compartment E, after which it passes through the other compartments and their perforated cylinders into the delivery C.

What I claim as my invention, and desire to secure by Letters Patent, is—

1. A filter subdivided by the vertical partitions G into a series of compartments, the upper part of the partitions being imperforate, and the compartments containing beds of filtering material in comminuted form and graded as to the size of the particles thereof, the finer being in the compartment adjacent to the outlet and the coarse elements in the compartment adjoining the inlet, the water being caused to pass through the partitions and separate filter-beds from the inlet to the outlet, substantially as set forth.

2. A filter consisting of a receptacle subdivided into two or more compartments containing separate beds of filtering material in comminuted form and graded as to size, the finer particles being in the chamber adjacent to the outlet, in combination with an auxiliary receptacle arranged over the compartments containing the filtering material, and means for transferring the filtering material from each compartment of the main into the auxiliary receptacle by a current of water, the particles of the filtering material being washed in transit, substantially as set forth.

3. A filter consisting of a receptacle subdivided into two or more compartments containing beds of filtering material, in combination with an auxiliary receptacle mounted thereon, and the transfer-pipes for discharging the contents of each of the compartments by means of a current of water into the said auxiliary receptacle, substantially as set forth.

4. A filter containing an inlet and an outlet, and consisting of two or more compartments inclosing beds of filtering material, in combination with an auxiliary receptacle mounted thereon, and pipes for transferring the contents of each of the compartments by means of a current of water into the auxiliary receptacle, the upper part of each compartment being provided with means of communication with the lower part of the said auxiliary receptacle, substantially as set forth.

5. A receptacle subdivided into two or more compartments by perforated partitions, each compartment containing a bed of filtering material, in combination with an auxiliary receptacle mounted over the same upon tracks, and the transfer washing-pipe for each of said compartments, the auxiliary receptacle containing a lining of perforated metal or wire-cloth and a waste-outlet, substantially as set forth.

Signed at New York, in the county of New York and State of New York, this 21st day of July, A. D. 1883.

JOHN W. HYATT.

Witnesses:
CHAS. C. GILL,
HERMAN GUSTOW.